April 28, 1959     J. R. McKEE, JR     2,884,100

COMPOSITE WASHER FOR FASTENERS

Filed May 23, 1955

INVENTOR.
JOHN R. McKEE, JR.
BY
Christy, Parmelee & Strickland
HIS ATTORNEYS

United States Patent Office 2,884,100
Patented Apr. 28, 1959

2,884,100

COMPOSITE WASHER FOR FASTENERS

John R. McKee, Jr., Pittsburgh, Pa.

Application May 23, 1955, Serial No. 510,085

8 Claims. (Cl. 189—36)

The present invention relates to metal fasteners for securing together a plurality of members and more specifically to a composite washer for use with such fasteners to provide a novel resilient sealing engagement between the washer and fastener head and between the washer and the members being fastened together.

Threaded fasteners are well known in the art for securing a plurality of members together or one or more members to a supporting structure. Washers have been used beneath the heads of such fasteners to provide a bearing therefor and also beneath nuts used with such fasteners. Frequently the need arises for sealing the openings through which the fastener shanks extend to make the connection water proof as where flat or corrugated metal sheets are applied as roofing to a structure or in erecting buildings, metal grain bins, liquid containers, etc. In many instances where using threaded fasteners held in place by nuts it is not practical or economical to hold the head of the fastener while tightening the nut. In these latter instances it is desirable to provide a washer which not only seals about the shank of the fastener, but also holds the head of the fastener against turning.

An object of the invention is to provide a composite washer of the character described having a rigid backing member, a resilient sealing member bonded to one face of the backing member and a member bonded to the opposite face of the backing member imparting frictional resistance to the turning of the head of the fastener engaged therewith.

Another object of the invention is to provide a composite washer of the character described wherein the washer may be readily retained in initial frictional engagement with the head and shank of the fastener after the fastener shank has been inserted through the opening in the washer.

A further object of the invention is to provide a composite washer of the character described having resilient members bonded to opposite faces thereof providing sealing engagement with the head of the fastener and the adjacent member through which the fastener extends.

In the drawings forming part of this disclosure:

Figure 1:
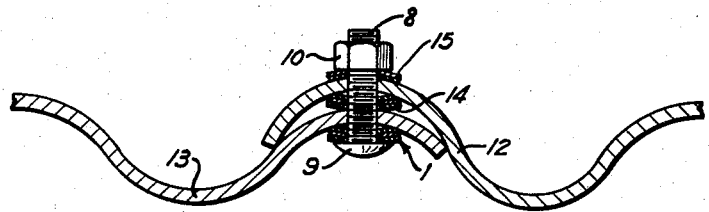
Fig. 1 shows in elevation an inverted fastener having the composite washer thereon applied to an overlapping joint of corrugated sheathing.

Figs. 4 through 7 show details of construction of the composite washer 1. The intermediate or backing member 2 of the washer may be of metal or other suitable rigid material. The term rigid as used herein is selected to distinguish from material which is flexible or compressible and does not necessarily mean that the material is not deformable to some degree as by bending. The backing member may be flat or dished as shown and is provided with a central opening 3 slightly larger than the shank of the fastener upon which it is to be mounted. On the outer face of member 2 is bonded a flexible compressible member 4 which is preferably larger than the member 2 so as to slightly overlap the peripheral edges thereof. A central opening 5 in member 4 is arranged concentrically of the backing member opening 3 and preferably the diameter of opening 5 is slightly greater than that of the opening 3. On the inner face of member 2 is bonded a flexible compressible member 6 which is preferably of smaller diameter than the member 2. A central opening 7 in member 6 is arranged concentrically of the opening 3 in the member 2 and is smaller in diameter than the opening 3 so as to overlap that opening. The diameter of opening 7 is also slightly smaller than the diameter of the shank of the fastener member 8 inserted therethrough. The members 4 and 6 may be of equal or different thickness than the member 2 and may be made of rubber or any other suitable materials having the necessary characteristics for sealing and frictionally resisting rotation of the shank 8 and head 9 of the fastening member. The preferred material is a synthetic rubber known as neoprene which is tough and bonds readily to metal. One method of bonding the members 4 and 6 to member 2 is by an intermediate layer which is described in U.S. Patent 2,147,620, to H. A. Winkleman et al., to which reference is hereby made. The fastener with which the composite washer is used may have any suitable head such as round, oval, square, hexagonal, etc. Those shown in the drawing have an oval or round head 9 since, as used herein, all tightening is done by means of the nut 10.

Figure 8:
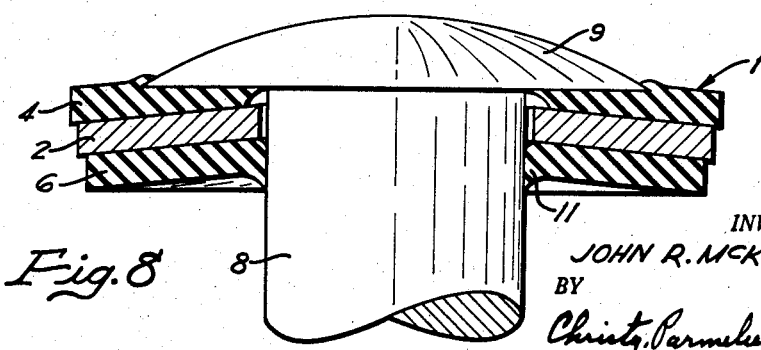
Fig. 8 shows a view with the composite washer assembled against the head of the fastener.

Referring now to Fig. 1 of the drawings wherein overlapping edges of corrugated sheathing are being secured together, the shank 8 of the fastener is entered into the composite washer through the member 4 and the head 9 thereof contacted with the adjacent face of the washer. The shank 8 of the fastener passing through member 6 deflects the portion 11 thereof overlapping openings 3 in backing member 2 and stretches it as the shank passes through opening 7 in member 6. The deflected expanded portions 11 of member 6 grip the shank, as shown in Fig. 8, holding the washer in engagement with fastener shank and head 9. This mounting of the washer on the fastener may be done in the factory before shipping to the place of use as an economy measure and the deflected washer portions will hold the fastener and washer in proper assembly during shipment and handling on the job.

The corrugated sheathing 12 and 13 is overlapping as shown or in any suitable manner and drilled to freely receive the shank 8 of the fastener. Any suitable gripping member 14 which may be the washer 1 or snap fastener, such as a Tinnerman frictionally engaging nut, is disposed between the overlapped sheeting portions 12 and 13 in alignment with the drilled sheeting holes and the fastener shank 8 is thrust through the sheeting holes and member 14 until it protrudes through the sheeting with the member 6 of the composite washer engaged with the under side of the bottom lap of the sheeting 13. The Tinnerman lock nut or other gripping device will hold the fastener within the sheeting until a nut can be mounted on the fastener. A suitable sealing washer 15 such as shown in my copending application Serial No. 371,216 now U.S. Patent No. 2,761,347, issued September 4, 1956, is mounted on the protruding threaded end of the shank of the fastener and a nut 10 is threaded onto the shank 8 in engagement with the metal backing member of washer 15. The nut 10 may then be tightened to complete the connection between the overlapped sheeting.

The nut 10 as it is turned, draws the shank 8 of the fastener upward and the member 6 of the composite washer into tight sealing engagement with the under side of the bottom lap of the sheeting. The gripping action of member 6 of the washer on the shank and head of the fastener prevents relative rotation between fastener head and washer until the nut is drawn tight. This plural engagement of the rubber faces 4 and 6 of the washer with the sheeting 13 and fastener head prevents rotation of the washer shank as the nut 10 is tightened. The nut 10 may be tightened sufficiently to cause fastener head 9 to make a moisture proof seal with member 4 of the composite washer. The sealing washer 15, as explained in my aforementioned copending application, seals the opening in the top lap of the sheeting through which the fastener extends so as to exclude moisture.

Figure 2:
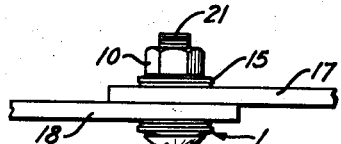
Fig. 2 shows a similar inverted fastener having the composite washer thereon and applied to flat sheathing.

Another use of the composite washer of the invention is shown in Fig. 2 of the drawings. Here two flat sheets 17 and 18 are overlapped and an opening drilled in the overlapped portions to receive the shank 21 of a fastener. The shank 21 of the fastener has a composite washer 1 of the invention mounted thereon with the washer member 4 adjacent to or engaged with the under side of fastener head 20. In this example the composite washer 1 is preferably provided with a flat backing plate 2. The shank 21 of the fastener is then inserted through the openings in the members 17 and 18 until it protrudes through member 17. A sealing washer 15 as in my aforementioned pending application may be mounted on the shank 21 and will retain the fastener in position until the nut 10 is assembled with the shank 21 and tightened. During the tightening operation, the composite washer 1 prevents relative rotation between the washer, fastener head and member 18 as previously described.

Figure 3:
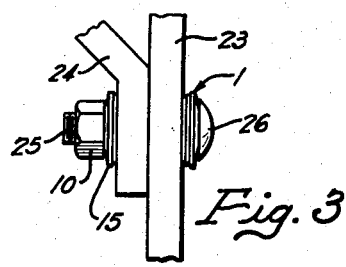
Fig. 3 shows in elevation the use of a fastener and composite washer, wherein the fastener head is behind a partition through which the fastener shank extends to engage a member being fastened to the partition.
Figure 5:
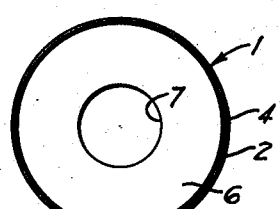
Fig. 5 shows a plan view of the resilient member bonded to outer face of the washer.
Figure 4:
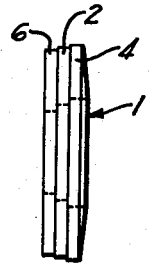
Fig. 4 shows a side elevation of the composite washer with resilient members on opposite faces thereof.
Figure 6:
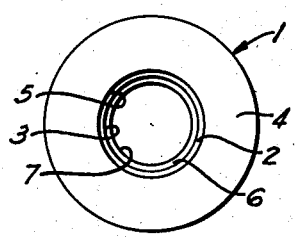
Fig. 6 shows a plan view of the resilient member bonded to the inner face of the washer.
Figure 7:
Fig. 7 shows a section through the washer illustrating the openings through the washer backing and resilient members to receive the fastener shank.

The assembly as shown in Fig. 3 of the drawings illustrates another use for the composite washer 1. Here the member 23 may be a partition through which a fastener having a composite washer 1 mounted on the shank 25 thereof is thrust through openings in members 23 and 24. A sealing washer 15 or a snap fastener as described may be mounted on shank 25 to hold the fastener and members in assembled relation until the nut 10 is mounted on shank 25 and tightened. Here as in the two previous examples, the faces 4 and 6 of washer 1 hold the washer and fastener head from turning as the nut 10 is tightened.

The three examples of use of the composite washer 1 are by way of illustration and not limitation in the many uses for the washer. The rubber members 4 and 6 of the washer, being securely bonded to the backing member 2 provide adequate frictional engagement to prevent the washer and fastener head from turning while the fastener nut is turned in tightening. It will be an obvious modification of the invention to mount one of my sealing washers 15 on the fastener shank adjacent the head of the fastener and any composite washer adjacent the nut of the fastener in any special application where the nut is to be tightened by turning the head of the fastener. In such a special application, the metal facing of the sealing washer of my aforesaid copending application permits the fastener head to turn freely while the composite washer of this application prevents the nut from turning with the fastener shank.

This application is a continuation-in-part of my copending application Serial No. 371,216, filed July 30, 1953, now U.S. Patent No. 2,761,347, issued September 4, 1956.

I claim:
1. A composite washer for use with a bolt and nut type fastener comprising a rigid backing member having a central opening for receiving a fastener shank, a rubber-like facing member bonded to one face of the backing member and provided with a central opening concentric with and as large as the backing member opening, a rubber-like facing member bonded to the opposite face of the backing member and having a central opening concentric with and smaller than the backing member opening.

2. A composite washer for use with a bolt and nut type fastener, comprising an apertured backing member of an O.D. providing a full bearing area for one rotatable end of such a fastener and an I.D. freely passing the shank of such a fastener, an apertured rubber-like facing member bonded to one face of the backing member and having an O.D. larger than the backing member and an I.D. as large as that of the backing member, a second apertured rubber-like facing member bonded to the opposite face of the backing member and having an I.D. smaller than that of the backing member.

3. A bolt and nut connection between two overlapping members which may be tightened from one side only, comprising means forming an opening extending through said overlapping members for receiving the shank of the bolt, a composite washer having an apertured backing member freely passing the shank of the bolt with rubber-like facing members bonded to opposite faces of the backing member and apertures in the facing members concentric with the aperture of the backing member, a bolt having a shaft and a head fixed on one end of a shaft, said shank being disposed through the composite washer and the openings of the overlapping members causing the composite washer to bear against the bolt head and adjacent one of said overlapping members, and a nut tightened on the end of the shank and against the other of said overlapping members.

4. A bolt and nut connection between overlapped portions of corrugated sheeting comprising aligned apertures in said overlapped sheeting portions, a composite washer disposed between said sheeting portions having an apertured backing member with the aperture aligned with said sheeting apertures, an apertured rubber-like facing member secured to one face of the backing member in engagement with the adjacent face of the underlapped sheeting portion, a rubber-like facing member secured to the other face of the backing member and engaging the adjacent face of the overlapped sheeting portion, an aperture in said latter facing member concentric with the backing member aperture but of a diameter smaller than a bolt shank to be received therein, a bolt including a head and a shank and having a second said composite washer thereon adjacent the bolt head, said bolt shank extending axially through said sheeting portions and composite washer apertures and projecting beyond the sheeting, and a nut axially tightened on said bolt shank securing the sheets and washers in abutting engagement.

5. A sealing washer of the character described, in combination, a rigid member having a central opening therethrough, a resilient rubber-like member bonded to one face of the rigid member and having a central opening concentric with said rigid member opening, a second resilient rubber-like member bonded to the second face of said rigid member, and a central opening in said second resilient rubber-like member smaller than and concentric with the central opening in said rigid member.

6. A sealing washer as defined in claim 5 wherein the rigid member is a plate-like circular member and the first-named resilient member is a plate-like circular member of greater diameter than the rigid member.

7. The sealing washer as defined in claim 6 wherein the said first-named sealing has a central opening larger than the concentric opening in the rigid member.

8. The sealing washer as defined in claim 6 wherein the second-named sealing washer is similar in shape to the rigid member and having a diameter smaller than that of the rigid member.

References Cited in the file of this patent

UNITED STATES PATENTS

| | | |
|---|---|---|
| 326,345 | Taylor | Sept. 15, 1885 |
| 1,335,756 | Scarff | Apr. 6, 1920 |
| 2,498,104 | Brandau et al. | Feb. 21, 1950 |
| 2,643,904 | Wehmanen | June 30, 1953 |
| 2,706,656 | Roubal | Apr. 19, 1955 |
| 2,761,347 | McKee | Sept. 4, 1956 |

FOREIGN PATENTS

| | | |
|---|---|---|
| 728,680 | Germany | Dec. 2, 1942 |